Nov. 18, 1930.  C. L. ARNOLD  1,782,332
EMBALMER'S PLUG
Filed March 25, 1930

C. L. Arnold
Inventor
By C A Snow & Co.
Attorneys.

Patented Nov. 18, 1930

1,782,332

UNITED STATES PATENT OFFICE

CHARLES L. ARNOLD, OF SHELBYVILLE, KENTUCKY

EMBALMER'S PLUG

Application filed March 25, 1930. Serial No. 438,801.

This invention relates to embalming apparatus, the primary object of the invention being to provide a plug or dam for obstructing the rectum or other canals of the body, to insure against the embalming fluids passing from the body.

An important object of the invention is to provide a device of this character which may be readily and easily applied and held in place by its frictional contact with the body, thereby obviating the unsanitary and complicated practice of packing the rectum or canals with cotton.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawing.

Figure 1:
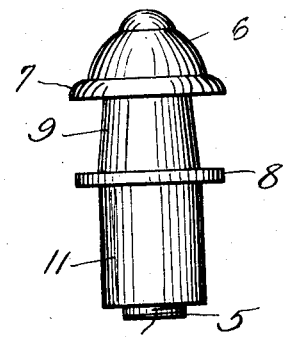
Figure 1 is an elevational view of an embalmer's plug, constructed in accordance with the invention.
Figure 2:
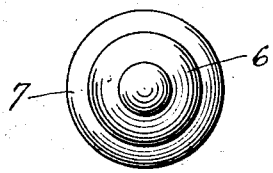
Figure 2 is an end elevational view thereof.

Referring to the drawing in detail, the device comprises a body portion in the form of a plug, the plug comprising an inner section formed preferably of hard rubber, the inner section being indicated by the reference character 5.

Figure 3:
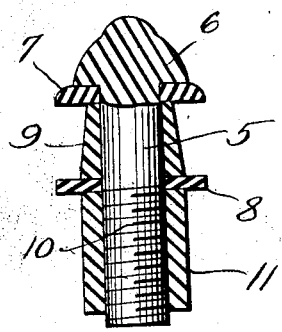
Figure 3 is a longitudinal sectional view through the plug.

A tapered head 6 is formed at one end of the device, and forms a part of the inner section 5, as clearly shown by Figure 3 of the drawing. Positioned on the inner section, and contacting with the head 6 is a washer 7 formed of soft rubber material so that the washer will flex, and permit the ready insertion of the device.

Another washer indicated by the reference character 8, is positioned on the inner section 5, the washer 8 being also constructed of soft rubber material, and as shown the washer 8 is held in spaced relation with the washer 7, by means of the tapered sleeve 9, formed of hard rubber material.

Threads 10 are formed on the inner section 5 of the plug, and are designed to cooperate with threads formed within the sleeve 11, which is constructed of hard rubber material to the end that when the plug is assembled, the washers 7 and 8 and sleeve 9, will be held in position on the inner section of the device.

From the foregoing it will be seen that due to the construction shown and described, I have provided a plug that may be readily and easily inserted in the rectum or other canals of the body to insure against the embalming fluids and matter passing from the body, the device being such as to insure a close fit between the plug and orifice in which it is positioned.

It will further be seen that owing to the construction of the device, it may be readily positioned without the necessity of the operator touching the body with the hands while the treatment is being administered.

I claim:

In a device of the class described, a body portion comprising an inner section and an outer section, said inner section being constructed of hard rubber material, a head at one end of the inner section, said head presenting a shoulder, a soft rubber washer positioned against the shoulder, a sleeve engaging the soft rubber washer to hold the washer in position against the shoulder, a soft rubber washer engaging the opposite end of the sleeve, and a sleeve threaded on the inner section and engaging the last mentioned washer to hold the first mentioned sleeve and washer in position.

In testimony that I claim the foregoing as my own, I have hereto affixed my signature.

CHARLES L. ARNOLD.